US012531374B2

(12) United States Patent
Suzuki et al.

(10) Patent No.: US 12,531,374 B2

(45) Date of Patent: Jan. 20, 2026

(54) CONNECTOR MATING STRUCTURE

(71) Applicant: Yazaki Corporation, Tokyo (JP)

(72) Inventors: Motoyoshi Suzuki, Makinohara (JP); Tomoyoshi Fukaya, Makinohara (JP); Masatoshi Nakamura, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 269 days.

(21) Appl. No.: 18/380,503

(22) Filed: Oct. 16, 2023

(65) Prior Publication Data

US 2024/0136768 A1 Apr. 25, 2024
US 2024/0235118 A9 Jul. 11, 2024

(30) Foreign Application Priority Data

Oct. 21, 2022 (JP) ................................ 2022-168760

(51) Int. Cl.
*H01R 13/639* (2006.01)
*H01R 13/627* (2006.01)

(52) U.S. Cl.
CPC ....... *H01R 13/639* (2013.01); *H01R 13/6272* (2013.01)

(58) Field of Classification Search
None
See application file for complete search history.

(56) References Cited

U.S. PATENT DOCUMENTS

| | | | | |
|---|---|---|---|---|
| 9,142,919 | B2 * | 9/2015 | Osada | H01R 13/639 |
| 10,862,243 | B2 * | 12/2020 | Nishiyama | H01R 13/641 |
| 2019/0067875 | A1 | 2/2019 | Ohfuku | |
| 2020/0136310 | A1 | 4/2020 | Nishiyama | |

FOREIGN PATENT DOCUMENTS

| | | |
|---|---|---|
| JP | 2011054534 A | 3/2011 |

* cited by examiner

*Primary Examiner* — Tho D Ta
(74) *Attorney, Agent, or Firm* — Sughrue Mion, PLLC

(57) ABSTRACT

A connector mating structure includes a male connector and a female connector mated with each other. The female connector includes a mating securing member. In a state where the male connector and the female connector of the connector mating structure are in a mating state and the mating securing member is positioned in a mating securing position, a forward end of a female locking section is positioned between an upper locking protrusion and a protrusion of an upper locking section. In this manner, assembling instability between a male housing, a female housing and the mating securing member in a forward-rearward direction is suppressed. Furthermore, a short circuit spring is in elastic contact with a short circuit release section and thus presses the female housing upward. In this manner, assembling instability between the male housing, the female housing and the mating securing member in an upward-downward direction is suppressed.

1 Claim, 9 Drawing Sheets

1

101

101

CONNECTOR MATING STRUCTURE

BACKGROUND OF THE INVENTION

Technical Field

The present invention relates to a connector mating structure with a mating securing member.

Background Art

A mating structure is known in which a male connector and a female connector are mated with each other, the female connector being provided with a mating securing member (see Patent Document 1).

The mating securing member is attached to a housing of the female connector so as to be movable between an initial position and a mating securing position, wherein by being positioned in the mating securing position, the mating securing member ensures complete mating of the male connector with the female connector.

CITATION LIST

Patent Literature

Patent Document 1: JP 2019-46636 A

SUMMARY OF THE INVENTION

Such a connector mating structure with the mating securing member has a problem that in the complete mating state, the connector mating structure tends to cause assembling instability between the male housing, the female housing and the mating securing member. This assembling instability is undesirable because it may cause sliding wear of terminal contacts.

Therefore, an objective of the present invention is to suppress assembling instability in a connector mating structure with a mating securing member.

The present invention provides a connector mating structure including: a male connector and a female connector configured to be mated with each other, wherein the male connector includes a male housing, a pair of male terminals and a short circuit spring, wherein the male housing includes a male locking protrusion, wherein in a non-mating state in which the male connector is not mated with the female connector, the short circuit spring is configured to come into elastic contact with the pair of male terminals, wherein the female connector includes a female housing, a pair of female terminals and a mating securing member, the mating securing member being movably attached to the female housing, wherein the female housing includes: a short circuit release section configured to be inserted between the pair of male terminals and the short circuit spring when mating the male connector with the female connector; and a female locking section configured to be locked to the male locking protrusion in order to maintain a mating state in which the male connector is mated with the female connector, wherein before mating the male connector with the female connector, the mating securing member is configured to positioned in an initial position, and after mating the male connector with the female connector, the mating securing member is movable to a mating securing position in vicinity of the male connector, wherein the mating securing member includes a mating securing member locking section, and wherein when the mating securing member is moved to the mating securing position, the mating securing member locking section is configured to cross over the female locking section so that in the mating securing position, the female locking section is positioned between the mating securing member locking section and the male locking protrusion.

The present invention enables the assembling instability in a connector mating structure with a mating securing member to be suppressed.

DETAILED DESCRIPTION OF PREFERRED EMBODIMENTS

Figure 1:
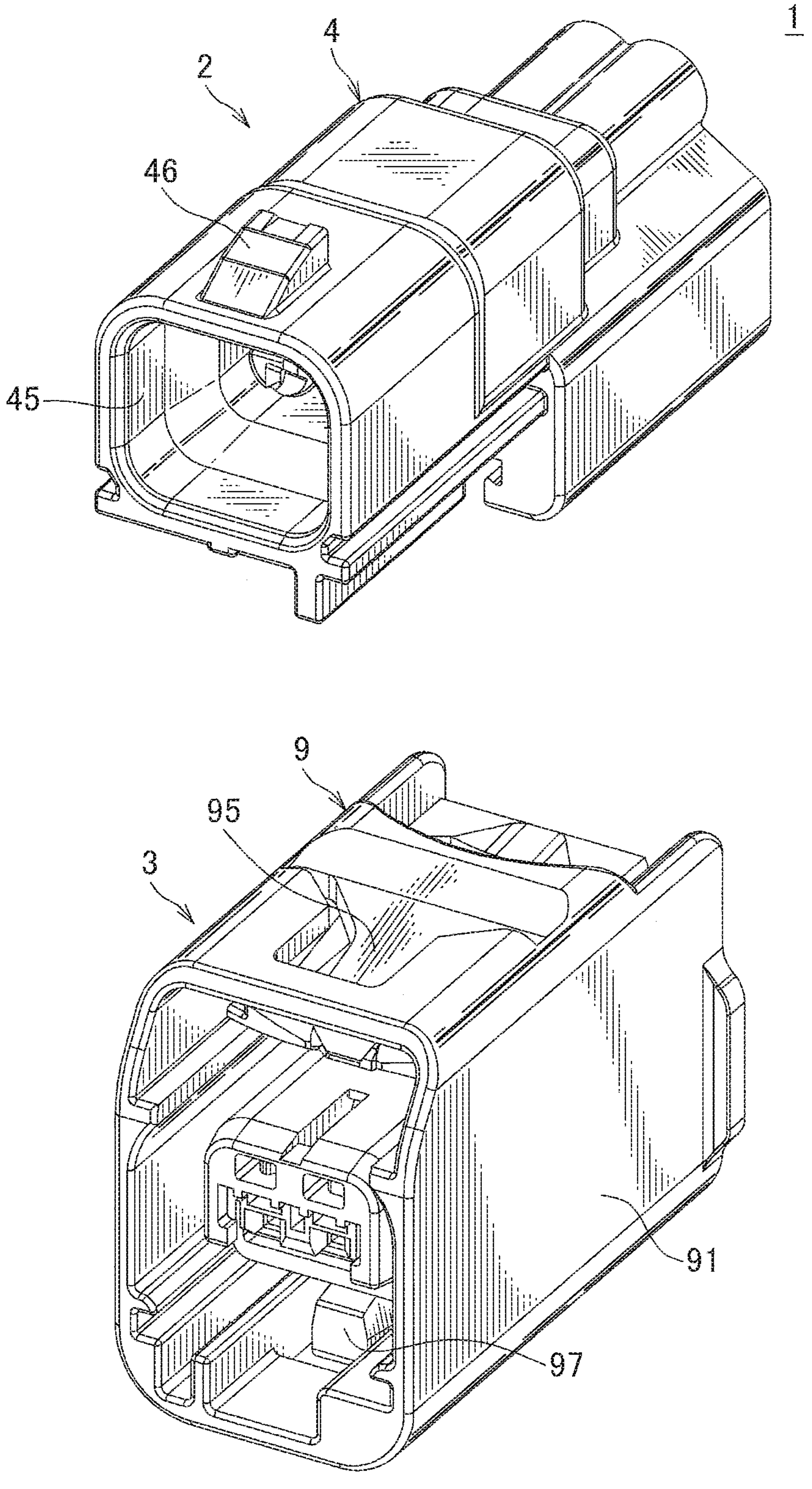
FIG. 1 shows perspective views of a male connector and a female connector which form a connector mating structure according to a first embodiment of the present invention.

A "connector mating structure" according to a first embodiment of the present invention will be described with reference to FIGS. 1 to 8.

A connector mating structure 1 as shown in FIGS. 1 and 6 to 8 includes a male connector 2 and a female connector 3 which are configured to be mated with each other. Furthermore, the female connector 3 is provided with a mating securing member 9. The mating securing member 9 is attached to a female housing 7 of the female connector 3 so as to be movable between an initial position (FIGS. 3, 4 and 6) and a mating securing position (FIGS. 5 and 8), wherein by being positioned in the mating securing position, the mating securing member 9 ensures a complete mating of the male connector 2 with the female connector 3.

In the present specification, with respect to the male connector 2, a side thereof facing the female connector 3 in a mating direction shall be referred to as "front" or "forward", and a side of the male connector 2 facing away from the female connector 3 in the mating direction shall be referred to as "rear" or "rearward". Furthermore, an upward direction in the drawing plane of FIG. 2 orthogonal to the mating direction shall be referred to as "upward", and a downward direction of the drawing plane of FIG. 2 shall be referred to as "downward". Moreover, a direction orthogonal to the forward-rearward direction and upward-downward direction shall be referred to as "width direction". Furthermore, with respect to the female connector 3, a side thereof facing the male connector 2 in the mating direction shall be referred to as "front" or "forward", and a side of the female connector 3 facing away from the male connector 2 in the mating direction shall be referred to as "rear" or "rearward". Furthermore, an upward direction in the drawing plane of FIG. 3 orthogonal to the mating direction shall be referred to as "upward", and a downward direction of the drawing plane of FIG. 3 shall be referred to as "downward". Moreover, a direction orthogonal to the forward-rearward direction and upward-downward direction shall be referred to as "width direction". In addition, the mating securing member 9 shall be described with respect to the forward-rearward direction, upward-downward direction and width direction of the female connector 3 attached to the female housing 7.

Figure 2:
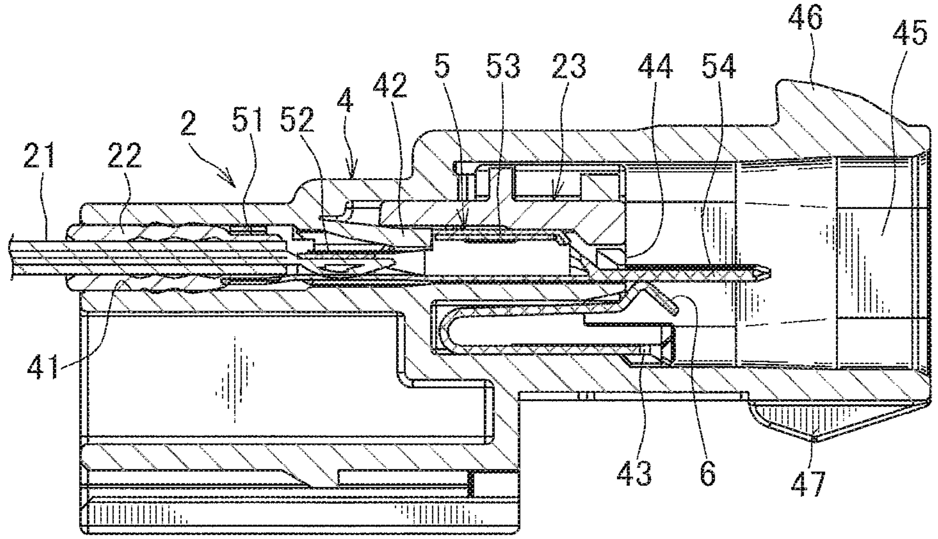
FIG. 2 shows a sectional view of the male connector of FIG. 1.

As shown in FIG. 2, the male connector 2 includes a pair of male terminals 5, a male housing 4, a short circuit spring 6, a rubber plug 22 and a male front retainer 23, the rubber plug 22 being fitted onto electric wires 21 connected to the respective male terminals 5.

The male terminal 5 is obtained by applying e.g. pressing process to a conductive metal sheet. Each of the male terminals 5 includes a coating caulking section 51, a core wire caulking section 52, an intermediate section 53 having a hollow polygonal tubular shape, and a male tab 54 having a bar shape, the coating caulking section 51 being caulked onto a portion of the electric wire 21 which is covered with an insulating coating, wherein the core wire caulking section 52 is caulked to a core wire of the electric wire 21 which is exposed by removing the insulating coating.

The male housing 4 is made of an insulating synthetic resin. The male housing 4 includes a terminal accommodating section 41, lances 42, a short circuit spring pressure insertion section 43, a female housing accommodating section 45, an upper locking protrusion 46 (corresponding to a male locking protrusion), and a lower locking protrusion 47.

The terminal accommodating section 41 is a section for accommodating the male terminals 5 and formed in a rearward half of the male housing 4. The lances 42 are formed in the terminal accommodating section 41. The lances 42 are engaged with the intermediate sections 53 of the male terminals 5 for preventing the male terminals 5 from being removed out. The male front retainer 23 is attached into the male housing 4 after accommodating the male terminals 5 into the terminal accommodating section 41, wherein the male front retainer 23 restricts deflection of the lances 42 to restrict disengagement of the intermediate sections 53 from the lances 42.

The short circuit spring pressure insertion section 43 is formed below the terminal accommodating section 41.

The female housing accommodating section 45 is formed in a forward half of the male housing 4. The female housing accommodating section 45 is formed in a box shape which is open forward, and receives a forward half of the female housing 7. When mating, the female housing 7 comes into contact with a deepest side 44 of an inner space within the female housing accommodating section 45. This deepest side 44 shall be referred to as "male connector mating side 44". A forward side of the female housing 7 which comes into contact with the male connector mating side 44 shall be referred to as "female connector mating side 74". The male tabs 54 of the male terminals 5 protrude from the male connector mating side 44 and are positioned inside the female housing accommodating section 45.

The upper locking protrusion 46 is formed on an upper surface of the female housing accommodating section 45. The lower locking protrusion 47 is formed on a lower surface of the female housing accommodating section 45.

The short circuit spring 6 is obtained by applying e.g. pressing process to a conductive metal sheet. The short circuit spring 6 is inserted under pressure into the short circuit spring pressure insertion section 43 and fixed therein. The short circuit spring 6 has a free end which is positioned inside the female housing accommodating section 45 and elastically deformable along the upward-downward direction. In a non-mating state of the male connector 2 and female connector 3, the free end of the short circuit spring 6 is in elastic contact with the male tabs 54 of the pair of male terminals 5. While FIG. 2 shows only one of the male terminals 5, the pair of male terminals 5 are arranged along the width direction of the male housing 4 (a direction perpendicular to the drawing plane of FIG. 2). Similarly, the short circuit spring 6 extends along the width direction of the male housing 4 (the direction perpendicular to the drawing plane of FIG. 2).

In the present example, the connector mating structure 1 is intended to be used for an airbag circuit for an automobile, wherein the pair of male terminals 5 are short-circuited by the short circuit spring 6 to prevent mis-inflation of an airbag. When mating the male connector 2 with the female connector 3, contact between the short circuit spring 6 and the pair of male terminals 5 is released by a short circuit release section 73 as described below to connect the airbag circuit.

The rubber plug 22 provides seal between the electric wire 21 and the terminal accommodating section 41.

Figure 3:
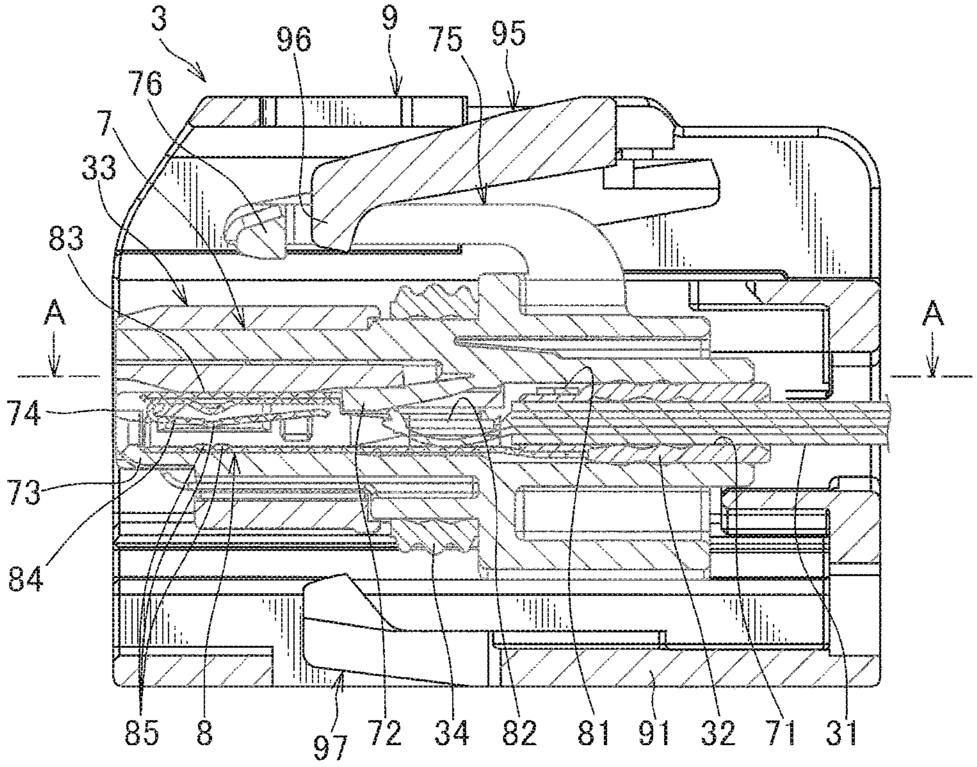
FIG. 3 shows a sectional view of the female connector of FIG. 1 with a mating securing member being positioned in an initial position.
Figure 4:
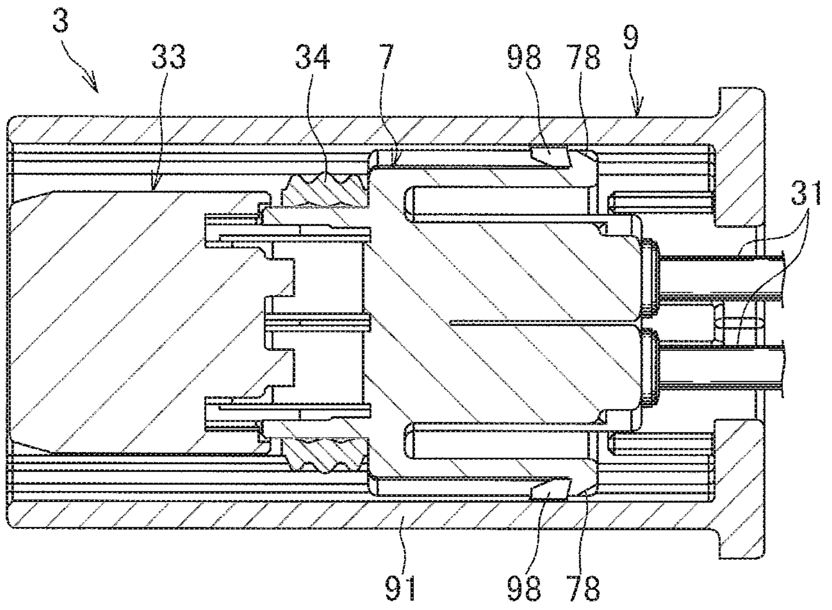
FIG. 4 shows a sectional view along the line A-A in FIG. 3.
Figure 5:
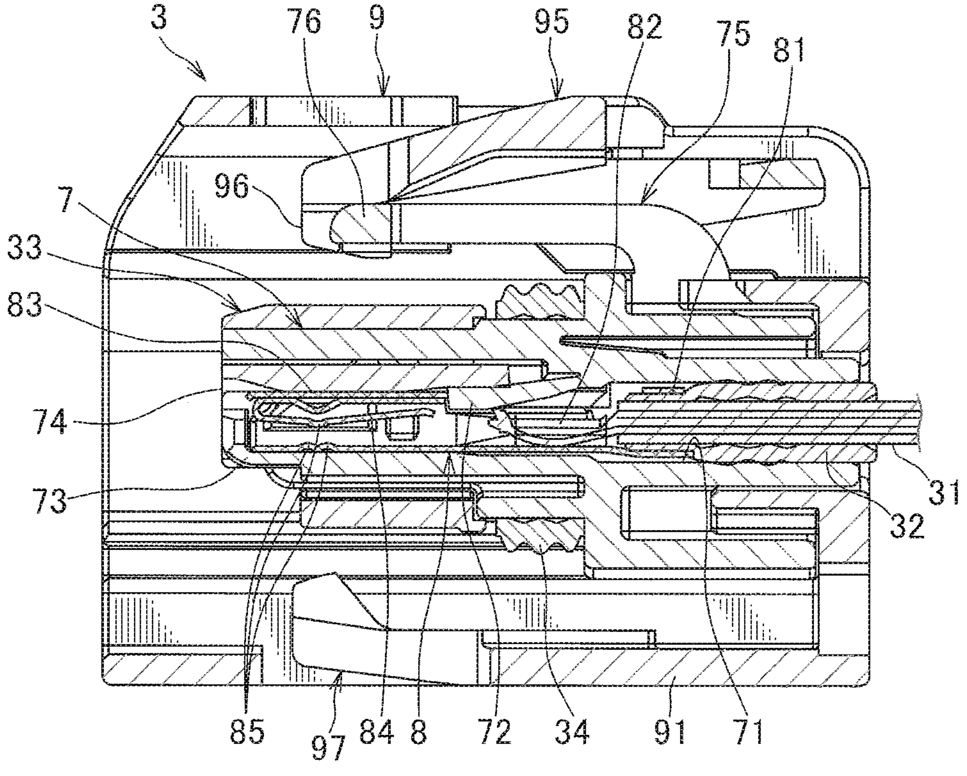
FIG. 5 shows a sectional view illustrating the mating securing member of FIG. 3 which is positioned in a mating securing position.

As shown in FIGS. 3 to 5, the female connector 3 includes a pair of female terminals 8, a female housing 7, a rubber plug 32 and a female front retainer 33, a seal 34, and the mating securing member 9, the rubber plug 32 being fitted onto electric wires 31 connected to the respective female terminals 8, wherein the mating securing member 9 is movably attached to the female housing 7.

The female terminal 8 is obtained by applying e.g. pressing process to a conductive metal sheet. Each of the female terminals 8 includes a coating caulking section 81, a core wire caulking section 82, a tubular section 83 having a quadrilateral tubular shape, and a spring piece 84 arranged in the tubular section 83, the coating caulking section 81 being caulked onto a portion of the electric wire 31 which is covered with an insulating coating, wherein the core wire caulking section 82 is caulked to a core wire of the electric wire 31 which is exposed by removing the insulating coating. The male tabs 54 are inserted into the tubular sections 83 and thus pressed toward inner surfaces of the tubular sections 83 by the spring pieces 84, whereby the male terminals 5 and female terminals 8 are electrically connected. The reference number 85 in FIG. 3 indicates a contact point for contacting the male tab 54.

The female housing 7 is made of an insulating synthetic resin. The female housing 7 includes a terminal accommodating section 71, lances 72, a short circuit release section 73, a female locking section 75, and female housing side locks 78.

The terminal accommodating section 71 is a section for accommodating the female terminals 8. The lances 72 are formed in the terminal accommodating section 71. The lances 72 are engaged with the tubular sections 83 of the female terminals 8 for preventing the female terminals 8 from being removed out. The female front retainer 33 is attached into the female housing 7 after accommodating the female terminals 8 into the terminal accommodating section 71, wherein the female front retainer 33 restricts deflection of the lances 72 to restrict disengagement of the tubular sections 83 from the lances 72.

The short circuit release section 73 is arranged at a forward end of the female housing 7 in its lower region. When mating the male connector 2 with the female connector 3, the short circuit release section 73 is inserted between the pair of male terminals 5 and the short circuit spring 6. The contact between the short circuit spring 6 and the pair of male terminals 5 is released by inserting the short circuit release section 73 between the pair of male terminals 5 and the short circuit spring 6.

The female locking section 75 is formed at an upper portion of the female housing 7 and extends in a cantilevered manner forward from rearward of the female housing 7. The female locking section 75 has a hole formed therein into which the upper locking protrusion 46 of the male housing 4 is fitted. This means that the female locking section 75 is formed in a frame shape. The reference number 76 in FIG. 3 indicates a forward end of the female locking section 75 which is a free end. When mating the male connector 2 with the female connector 3, the female locking section 75 is locked to the upper locking protrusion 46 to maintain a mating state of the male connector 2 and the female connector 3.

The female housing side locks 78 are configured to be locked to side locks 98 of the mating securing member 9, as shown in FIG. 4. These side locks 78 and 98 serve for restricting forward overmovement of the female housing 7 with respect to the mating securing member 9.

The rubber plug 32 provides seal between the electric wire 31 and the terminal accommodating section 71.

The seal 34 is fitted onto an outer circumference of the female housing 7 and provides seal between the female housing 7 and the male housing 4.

The mating securing member 9 is made of an insulating synthetic resin. The mating securing member 9 includes a surrounding wall 91, the upper locking section 95 (corresponding to a mating securing member locking section), the lower locking section 97, and a pair of side locks 98.

The surrounding wall 91 is formed in a quadrilateral tubular shape with an upper wall, a lower wall and a pair of side walls and surrounds the female housing 7. The female housing accommodating section 45 of the male housing 4 is inserted inside the surrounding wall 91. The female housing 7 is inserted into the female housing accommodating section 45. Each of the side locks 98 protrudes from an inner surface of one of the pair of side walls of the surrounding wall 91.

The upper locking section 95 extends in a cantilevered manner forward and downward from the upper wall of the surrounding wall 91. A forward end of this upper locking section 95 is a free end, and a protrusion 96 is provided at the forward end, wherein the protrusion 96 protrudes downward.

Figure 6:
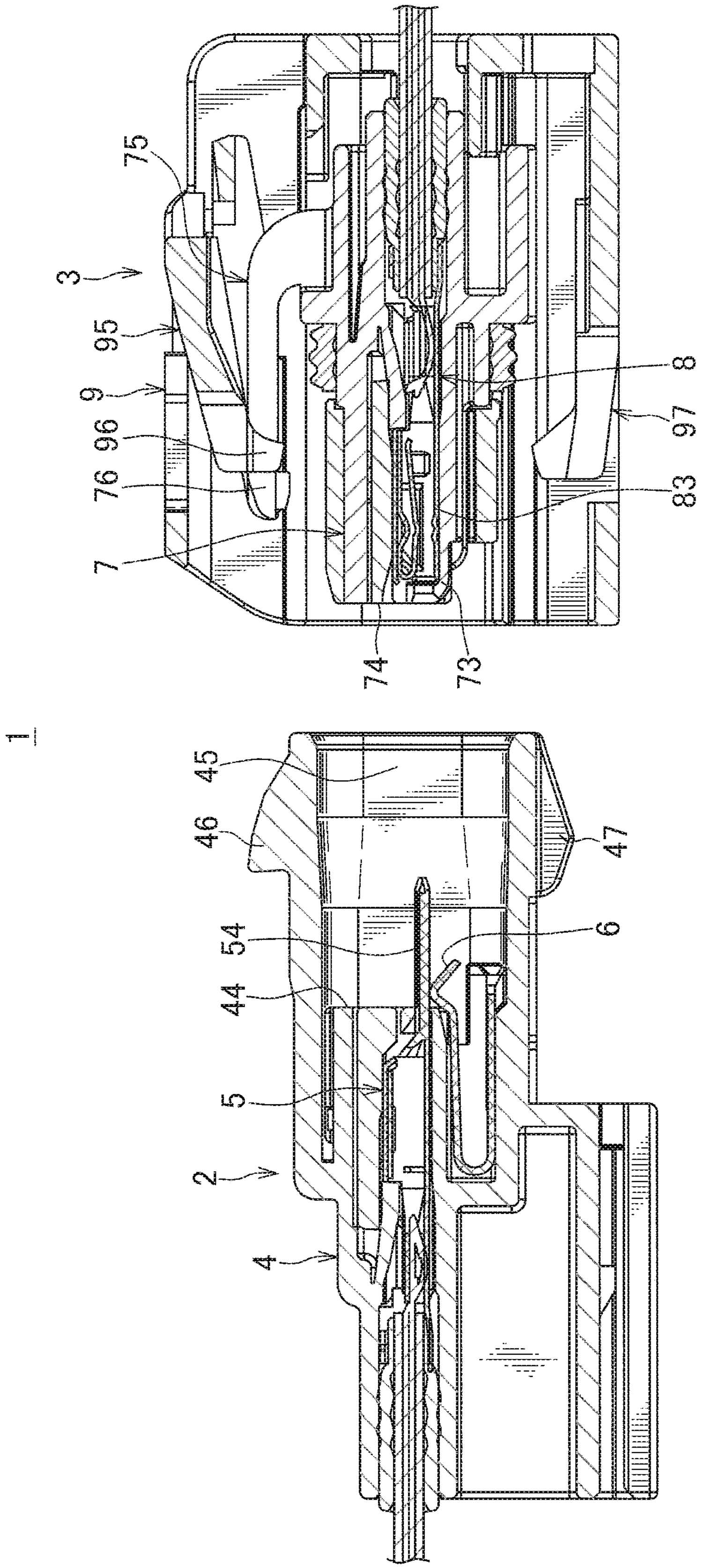
FIG. 6 shows a sectional view illustrating a state of the male connector and female connector as shown in FIG. 1 before mating.

Before mating the male connector 2 with the female connector 3, the mating securing member 9 is positioned in an initial position which is located far away from the male connector 2, as shown in FIG. 6. In the state of the mating securing member 9 being positioned in the initial position, the protrusion 96 of the upper locking section 95 is positioned more rearward than the forward end 76 of the female locking section 75. In this manner, forward movement of the mating securing member 9, i.e., movement to the mating securing position, is restricted.

Figure 7:
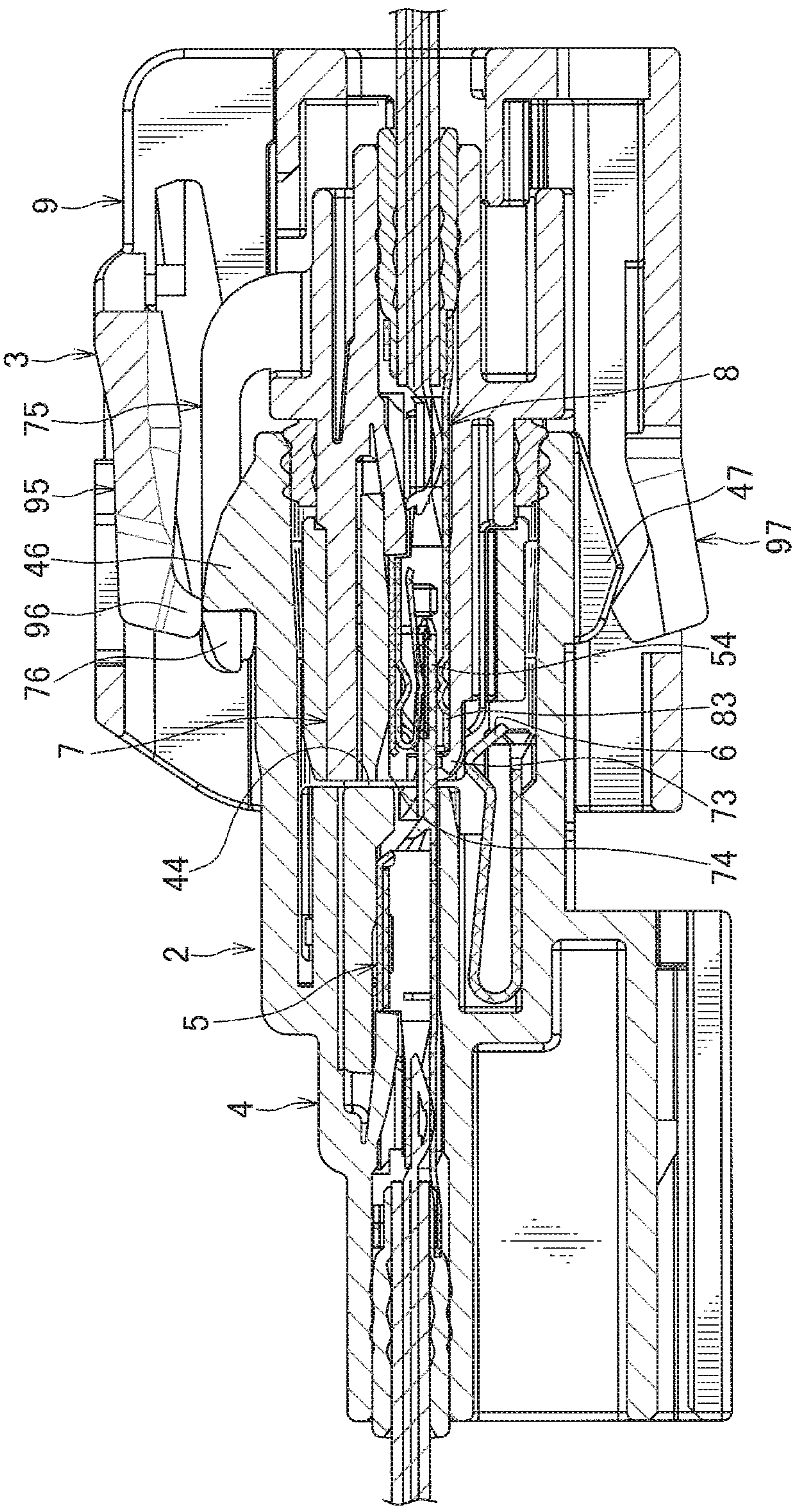
FIG. 7 shows a sectional view illustrating how the male connector and female connector of FIG. 6 are mated with each other and the mating securing member is moved from the initial position to the mating securing position.

Starting from this state, the male connector 2 and female connector 3 are mated with each other as shown in FIG. 7, whereby the upper locking protrusion 46 is locked to the female locking section 75 and the upper locking section 95 is pushed upward by the upper locking protrusion 46. In this manner, the mating securing member 9 is allowed to be moved to the mating securing position.

Furthermore, the upper locking section 95 pushed upward by the upper locking protrusion 46 is moved forward due to its own elastic restoring force and a surface shape of a down slope formed at the forward end 76 of the female locking section 75, wherein the upper locking section 95 then crosses over the forward end 76. In this manner, the mating securing member 9 is positioned in the mating securing position, as shown in FIG. 8.

After the upper locking section 95 has crossed over the forward end 76 of the female locking section 75 during movement to the mating securing position, the forward end 76 of the female locking section 75 is then positioned between the upper locking section 95 and the upper locking protrusion 46 in the mating securing position. This means that the forward end 76 of the female locking section 75 is positioned between the upper locking protrusion 46 and the protrusion 96 of the upper locking section 95.

The lower locking section 97 extends forward from the lower wall of the surrounding wall 91. In the mating securing position, the lower locking section 97 is locked to the lower locking protrusion 47 of the male housing 4.

Figure 8:
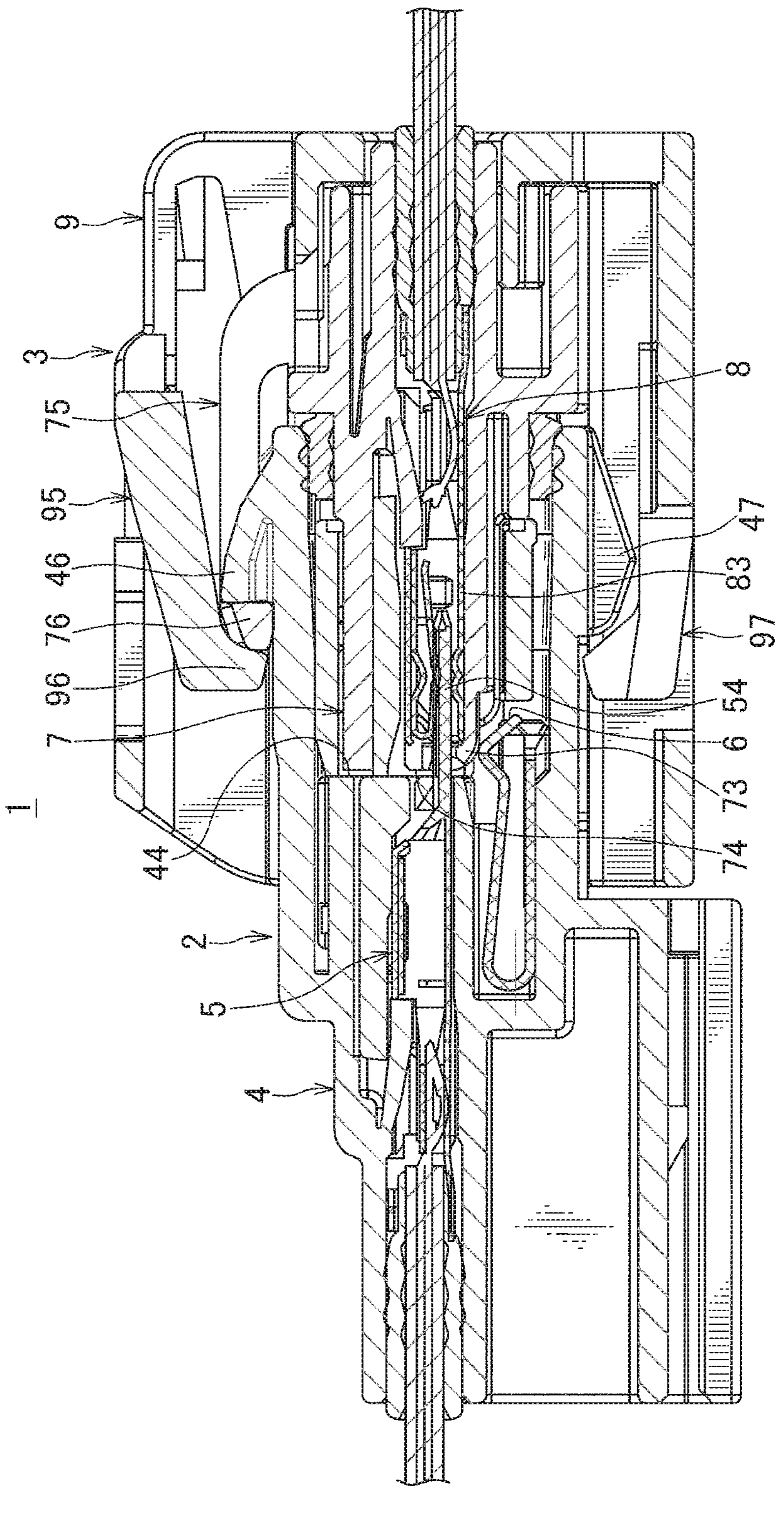
FIG. 8 shows a sectional view of the mating securing member of FIG. 7 positioned in the mating securing position.

The above-described connector mating structure 1 is provided such that in the state where the male connector 2 and the female connector 3 are in the mating state as shown in FIG. 8 and the mating securing member 9 is positioned in the mating securing position, the forward end 76 of the female locking section 75 is positioned between the upper locking protrusion 46 and the protrusion 96 of the upper locking section 95. In this manner, assembling instability between the male housing 4, the female housing 7 and the mating securing member 9 in the forward-rearward direction is suppressed. Furthermore, the short circuit spring 6 is in elastic contact with the short circuit release section 73 and thus presses the female housing 7 upward. In this manner, assembling instability between the male housing 4, the female housing 7 and the mating securing member 9 in the upward-downward direction is suppressed. In this manner, the sliding wear of terminal contacts is suppressed by suppressing the assembling instability in the forward-rearward direction as well as in the upward-downward direction.

A "connector mating structure" according to a second embodiment of the present invention will be described with reference to FIGS. 9 to 12. In FIGS. 9 to 12, same components as those in the first embodiment are indicated with same reference signs and the corresponding description will be omitted.

Figure 11:
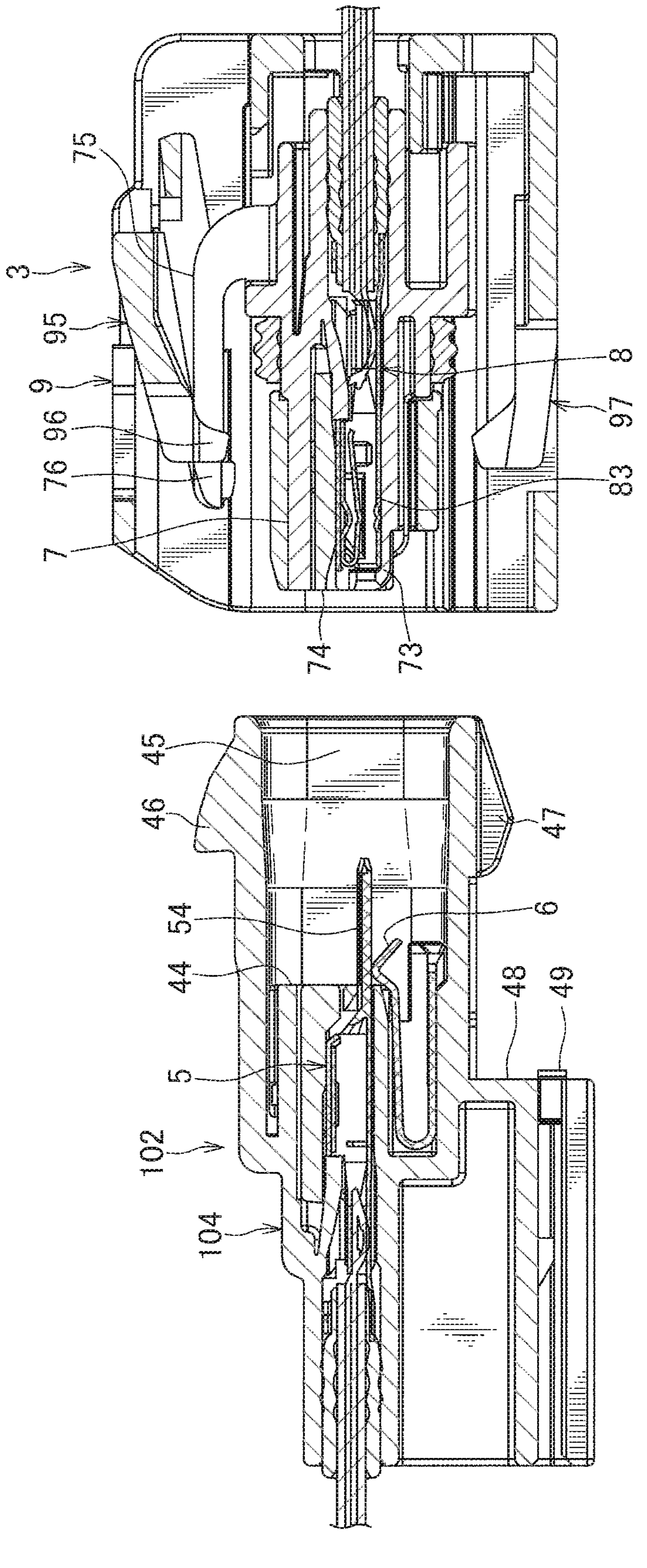
FIG. 11 shows the male connector and a female connector before mating, wherein the male connector and female connector form the connector mating structure according to the second embodiment of the present invention.
Figure 12:
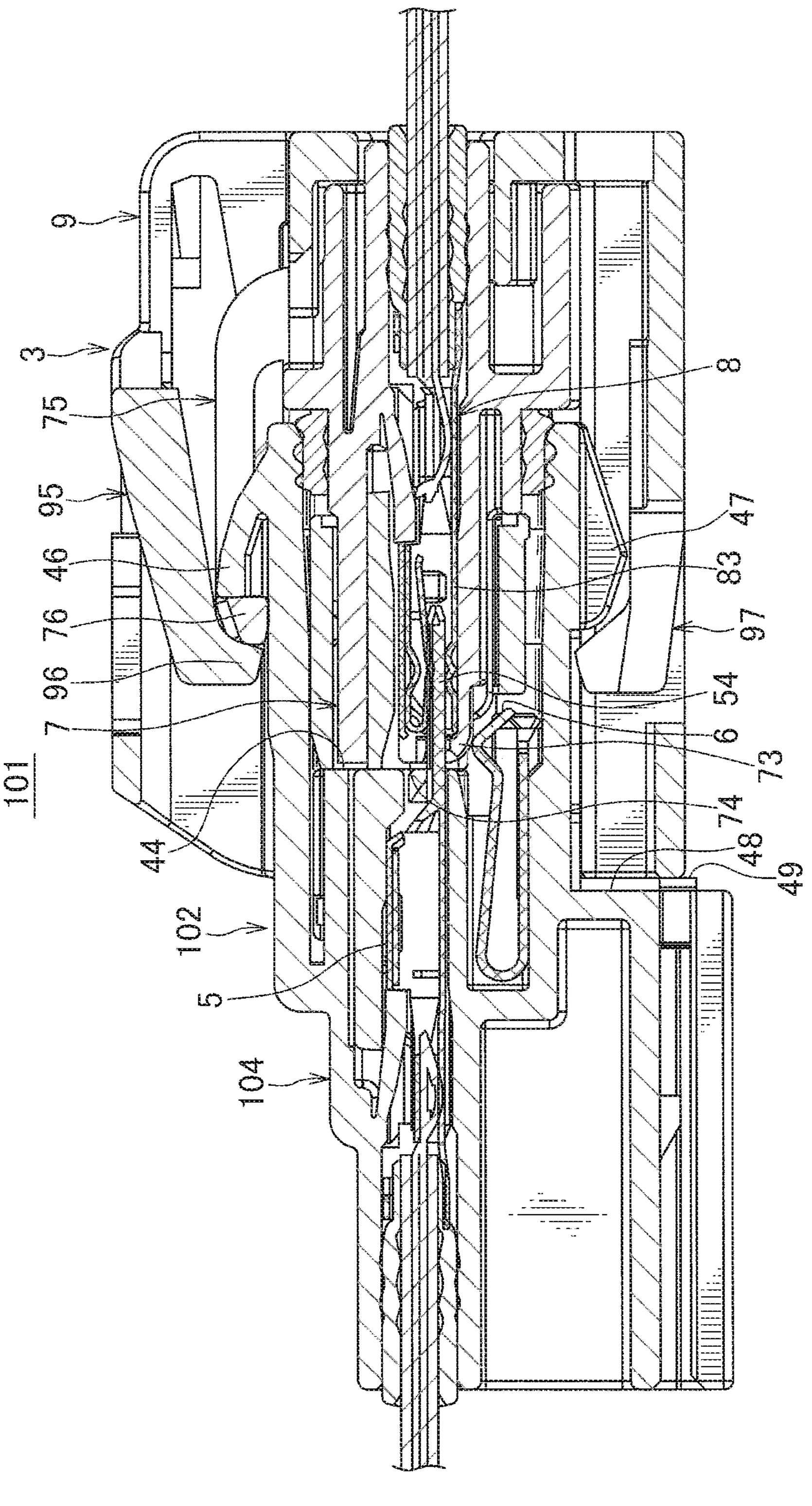
FIG. 12 shows a sectional view illustrating how the male connector and female connector of FIG. 11 are mated with each other and the mating securing member is positioned in a mating securing position.

A connector mating structure 101 as shown in FIGS. 11 and 12 includes a male connector 102 and a female connector 3 which are configured to be mated with each other. The female connector 3 is configured in the same manner as that in the first embodiment.

Figure 9:
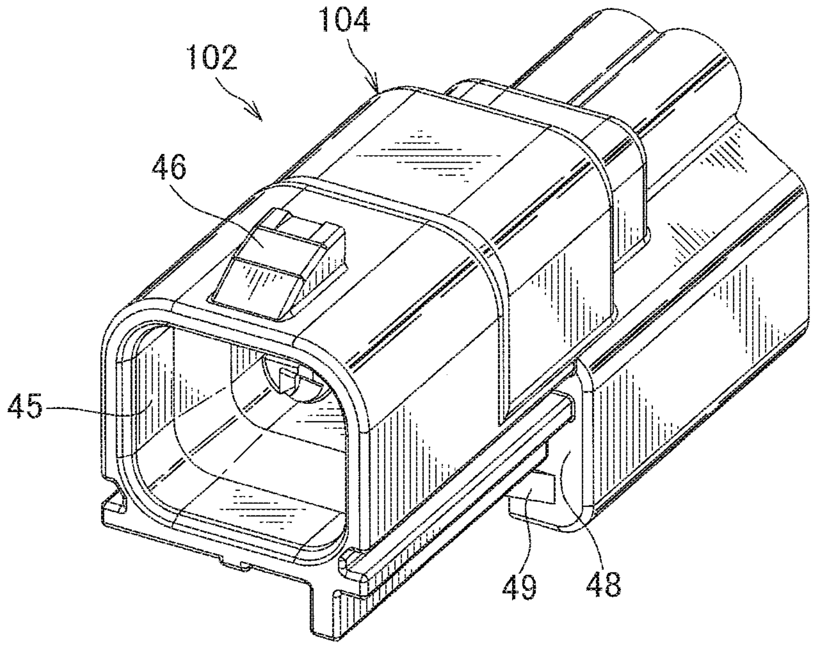
FIG. 9 shows a perspective view of a male connector which forms part of the connector mating structure according to a second embodiment of the present invention.
Figure 10:
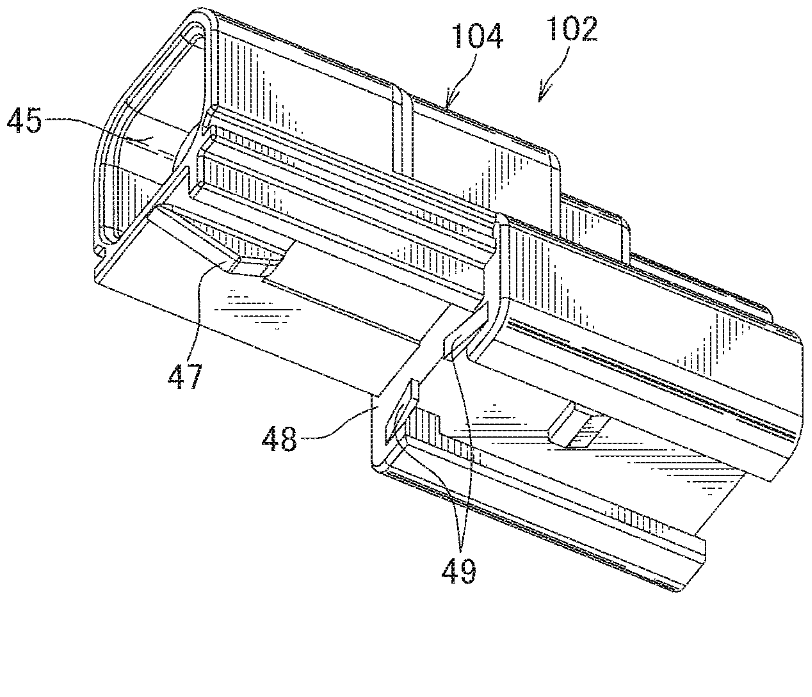
FIG. 10 shows a perspective view of the male connector of FIG. 9 as shown at a different angle.

The male connector 102 includes a male housing 104 which is provided with a pair of assembling instability suppressing elastic elements 49, as shown in FIGS. 9 and 10. Otherwise, the male connector 102 is configured in the same manner as the male connector 2 according to the first embodiment.

The pair of assembling instability suppressing elastic elements 49 is arranged on an outer surface 48 of the male housing 104. This outer surface 48 extends perpendicularly to the lower surface of the female housing accommodating section 45. The pair of assembling instability suppressing elastic elements 49 are arranged in a width direction of the male housing 104.

As shown in FIG. 12, in a mating state of the male connector 102 and the female connector 3, the pair of assembling instability suppressing elastic elements 49 comes into contact with a forward end of a lower wall of a surrounding wall 91 of the mating securing member 9 which has been positioned in a mating securing position, wherein the pair of assembling instability suppressing elastic elements 49 then presses the mating securing member 9 toward an initial position. In this manner, assembling instability between the male housing 104, the female housing 7 and the mating securing member 9 in the forward-rearward direction is further suppressed.

It is to be noted that the embodiments as described above merely illustrate representative examples for the present invention, and the present invention is not limited to these embodiments. I.e., various modifications may be performed without departing from the core of the present invention. It is obvious that such modifications are included in the scope of the present invention as far as the modifications comprise the features of the present invention.

REFERENCE SIGNS LIST

1, 101 Connector mating structure
2, 102 Male connector
3 Female connector
4, 104 Male housing
5 Male terminals
6 Short circuit spring
7 Female housing
8 Female terminals
9 Mating securing member
46 Upper locking protrusion (male locking protrusion)
73 Short circuit release section
75 Female locking section
95 Upper locking section (mating securing member locking section)

What is claimed is:

1. A connector mating structure comprising:

a male connector and a female connector configured to be mated with each other, wherein the male connector includes a male housing, a pair of male terminals and a short circuit spring, wherein the male housing includes a male locking protrusion, wherein in a non-mating state in which the male connector is not mated with the female connector, the short circuit spring is configured to come into elastic contact with the pair of male terminals, wherein the female connector includes a female housing, a pair of female terminals and a mating securing member, the mating securing member being movably attached to the female housing, wherein the female housing includes:

a short circuit release section configured to be inserted between the pair of male terminals and the short circuit spring when mating the male connector with the female connector; and a female locking section configured to be locked to the male locking protrusion in order to maintain a mating state in which the male connector is mated with the female connector, wherein before mating the male connector with the female connector, the mating securing member is configured to positioned in an initial position, and after mating the male connector with the female connector, the mating securing member is movable to a mating securing position in vicinity of the male connector, wherein the mating securing member includes a mating securing member locking section, wherein when the mating securing member is moved to the mating securing position, the mating securing member locking section is configured to cross over the female locking section so that in the mating securing position, the female locking section is positioned between the mating securing member locking section and the male locking protrusion, and wherein the male housing includes an assembling instability suppressing elastic element configured to come into contact with the mating securing member positioned in the mating securing position and to press the mating securing member toward the initial position.

* * * * *